United States Patent [19]

Canterino

[11] 4,230,836
[45] Oct. 28, 1980

[54] CHEMICALLY CROSS-LINKED POLY(P-METHYLSTYRENE)

[75] Inventor: Peter J. Canterino, Towaco, N.J.

[73] Assignee: Mobil Oil Corporation, New York, N.Y.

[21] Appl. No.: 33,603

[22] Filed: Apr. 26, 1979

Related U.S. Application Data

[63] Continuation-in-part of Ser. No. 870,778, Jan. 19, 1978, abandoned.

[51] Int. Cl.² .................................................. C08F 8/00
[52] U.S. Cl. ........................... 525/332; 260/33.6 UA; 525/10; 525/292; 525/316; 525/337; 525/353; 525/356; 525/370; 525/387; 525/529; 526/293; 526/340; 526/342; 526/346; 526/347; 526/347.1

[58] Field of Search ...................... 526/21, 43, 44, 57, 526/293, 346, 347, 347.1; 525/332, 387; 260/878 R, 880 R

[56] References Cited

U.S. PATENT DOCUMENTS

| | | | |
|---|---|---|---|
| 2,763,702 | 9/1956 | Amos | 260/671 P |
| 3,008,937 | 11/1961 | Ruffing | 526/347 |
| 4,086,287 | 4/1978 | Kaeding | 260/671 P |

*Primary Examiner*—Stanford M. Levin
*Attorney, Agent, or Firm*—Charles A. Huggett; Hastings S. Trigg

[57] ABSTRACT

Polymers of p-methyl styrene can be cross-linked with chemical cross-linking agents, such as peroxides, to produce insoluble products. The methyl styrene used has a high content of the para-isomer. An important end use is for rigid food or beverage containers subjected to thermal conditions.

3 Claims, No Drawings

CHEMICALLY CROSS-LINKED POLY(P-METHYLSTYRENE)

CROSS REFERENCE TO RELATED APPLICATIONS

This application is a continuation-in-part of copending application Ser. No. 870,778, abandoned, filed Jan. 19, 1978.

BACKGROUND OF THE INVENTION

1. Field of the Invention

This invention relates to chemically cross-linked poly(p-methylstyrene).

2. Description of the Prior Art

Styrene has been used for a long period of time in the manufacture of polymers and polystyrene has attained a large market for many purposes. Alkylated styrenes such as alpha-methylstyrene have also been of interest for certain purposes.

The nuclear alkyl substituted styrenes have also been used in various applications. The monomer which has been principally used is known as vinyltoluene. This is a mixture which consists mainly of meta- and para-methyl styrenes (vinyl toluenes) produced by the catalytic dehydrogenation of a mixture of the corresponding m- and p-ethyltoluenes. The ethyltoluene mixture is itself obtained by the fractional distillation of a mixture of the o-, m- and p-ethyltoluenes. The ratio of the m- and p-isomers in the monomer mixture is approximately 65:35 (m:p). A convenient summary of the preparation and properties of the monomer mixture and of polymers produced from it is given in "Styrene: Its Polymers, Copolymers and Derivatives" Ed. R. H. Boundy, R. F. Boyer, ACS Monograph Series, 1952, Hafner Publishing Company, pages 1232 to 1245.

In U.S. Pat. No. 3,008,937, there is disclosed cross-linking of m, p-vinyltoluene with a peroxide catalyst. It is to be noted, however, that the vinyltoluene used by and available to the patentees was that described in the aforementioned ACS Monograph. Such monomer mixture was manufactured by Dow Chemical Company, the patentees' assignee, and contained 65% meta-isomer and 35% para-isomer.

Chemically cross-linked poly-m, p-vinyltoluene is disadvantageous, because it has too low glass transition temperature (Tg). A Tg that is sufficiently high is an important factor in the end use of the cross-linked polymer as rigid food or beverage containers that are subjected to thermal conditions.

THE INVENTION

It has now been found that polymers with advantageous properties can be prepared from a mixture of isomeric methyl ethenylbenzenes having a particular isomeric distribution.

The polymerizable isomeric mixture consists essentially of the m- and p- isomers of methyl ethenyl benzene. The mixture is substantially devoid of the o-isomer; when the o-isomer is present, the amount of it is less than 0.1% based on the total weight of the isomer mixture.

The ratio of the isomers in the mixture is as follows:

| Isomer | Wt. Percent |
| --- | --- |
| o-Methylstyrene | Less than 0.1, preferably less than 0.05. |
| m-Methylstyrene | Less than 10. |
| p-Methylstyrene | At least 90. |

Generally, the proportion of the p-isomer (1-methyl-4-ethenyl benzene or p-methylstyrene) will be at least 95 weight percent with the m-isomer (1-methyl-3-ethenyl benzene or m-methylstyrene) constituting less than 5 weight percent of the mixture. Particularly preferred mixtures contain 97 to 99 weight percent of the p-isomer and 1 to 3 weight percent of the m-isomer.

The isomer mixture may contain impurities and adventitious materials in addition to the methyl ethenyl benzenes. Generally, these other materials will not constitute more than 1 percent by weight of the total mixture. These other materials derive essentially from the process used to make the methyl ethenyl benzenes.

A typical isomer mixture has the following analysis, by weight, determined by gas chromatography:

| | Wt. Percent | |
| --- | --- | --- |
| Total vinyl benzenes | | 99.41 |
| Residue: | | |
| Ethyl toluene | 0.10 | |
| Mesitylenes, etc. | 0.15 | |
| Non-vinylic higher boilers | 0.34 | |
| | 0.59 | 0.59 |
| | | 100.00 |
| Vinyl benzenes: | | |
| 1-methyl-2-ethenyl-benzene | | 0.05 |
| 1-methyl-3-ethenyl-benzene | | 2.6 |
| 1-methyl-4-ethenyl-benzene | | 97.4 |

The mixture of the isomeric methyl ethenyl benzenes may be obtained by the catalytic dehydrogenation of a mixture of the corresponding ethyl toluenes, which in turn may be obtained by the selective alkylation process disclosed and claimed in co-pending U.S. Patent Applications Ser. No. 709,981, abandoned, filed July 19, 1976 and Ser. No. 801,177, abandoned, filed May 27, 1977 by Warren W. Kaeding and Lewis B. Young, the disclosures of which are incorporated herein by reference.

In its application to the production of the methyl ethenyl benzenes, the method disclosed in the Kaeding et al. applications essentially involves the alkylation of toluene with ethylene in the presence of certain crystalline aluminosilicate zeolite catalysts. The catalyst has a silica to alumina ratio of at least 12 and a constraint index (defined in the application) within the range of 1 to 12. The process produces an extremely high proportion of the 1-methyl-4-ethyl benzene isomer, with only a minor proportion of the 1-methyl-3-ethyl benzene isomer and negligible amounts of the 1-methyl-2-ethyl benzene isomer. The almost complete absence of the 1-methyl-2-ethyl isomer is highly advantageous because this isomer tends to produce undesired by-products during the dehydrogenation step (indanes and indenes which adversely affect the properties of the resultant polymers and which cannot be easily separated from the methyl ethenyl benzenes).

The mixture of isomeric methyl ethyl benzenes may be subjected to distillation prior to the dehydrogenation step in order to separate out various by-products and after the dehydrogenation has been completed, a further distillation may be carried out to separate the methyl ethenyl benzenes from their saturated precursors.

Since the proportion of the 1-methyl-4-ethenyl benzene in the mixture is so high, usually at least 95 by weight, the mixture can be regarded essentially as the para (1,4-) isomer. For convenience in this specification, therefore, the mixture may be referred to as "p-methylstyrene monomor" and the polymer produced by the polymerization of this mixture in the absence of other monomers as "the homopolymer", in order to distinguish it from polymers produced by polymerizing the mixture with other, copolymerizable monomers. It should, however, be remembered that "the homopolymer" is, in fact, a copolymer of the isomeric monomers.

The mixture of the isomers may be polymerized by itself to produce "the homopolymer" or with other copolymerizable monomers to produce copolymers. In general, the polymerization conditions appropriate to styrene will also be useful with the methyl ethenyl benzene mixture, whether polymerized by itself or with other monomers. Thus, polymerization may be effected under bulk conditions or in solution, suspension or emulsion techniques comparable to those used for styrene polymerization. The polymerization catalysts may be of the free radical, anionic or cationic types. Suitable free radical initiators include di-tertiary butyl peroxide, azobis (isobutyronitrile), di-benzoyl peroxide, tertiary butyl perbenzoate, di-cumyl peroxide and potassium persulfate. Cationic initiators are generally of the Lewis acid type, for example, aluminum trichloride, boron trifluoride, boron trifluoride etherate complexes, titanium tetrachloride and the like. Anionic initiators are generally of the formula RMy where R is organo, mono- or polyvalent and may be alkyl, alkenyl, aryl, aralkyl, and alkaryl, and may contain from 1 to about 50 carbon atoms; and y is 1 to 4, and preferably 1 or 2. Such initiators as methyl lithium, ethyl lithium, methyl sodium, propyl lithium, n-butyl lithium, sec-butyl lithium, tert-butyl lithium, butyl sodium, lithium naphthalene, sodium naphthalene, potassium naphthalene, cesium naphthalene, phenyl sodium, phenyl lithium, benzyl lithium, cumyl sodium, cumyl potassium, methyl potassium, ethyl potassium, and so forth may be used in this reaction. Also, metal initiators containing a dianion, such as the alkali metal salts of 1,1-diphenylethylene and alpha-methylstyrene tetramer and the radical anion initiators of the sodium naphthalene type may be used. Branched chain polymers may be obtained by using multifunctional initiators, for example, 1,3,5-trilithiocyclohexane and 1,4,7,10-tetrapotassiodecane. In the anionic polymerization each molecule of the initiator starts one anionic polymer chain; multiple anions can permit addition of secondary chains to the main chain. Stereospecific catalysts can also be used to advantage. Such catalysts are generally of the well known Ziegler type, comprising a transition metal of Group 4A, 5A, 6A or 7, in a valence state lower than its maximum in combination with an organometallic compound of Group 2 or 3.

Among the reducible transitional metal compounds suitable for the purposes of this invention are the heavy metal, inorganic compounds such as halide, oxyhalides, complex halides, hydroxides, and organic compounds such as alcoholates, acetates, benzoates, and acetyl acetonates, of the requisite metals. Such metals include titanium, zirconium, hafnium, thorium, uranium, vanadium, niobium, tantalum, chromium, molybdenum, tungsten and iron. The metal halides, particularly the chlorides are generally preferred. Titanium, zirconium, and vanadium are the most active metals. The following heavy metal compounds are readily reducible: titanium tetrachloride, titanium tetrabromide, zirconium tetrachloride, vanadium tetrachloride, and zirconium acetylacetonate.

The reduction may be effected in any suitable manner, for example, by reduction with hydrogen or aluminum. Titanium tetrachloride can be readily reduced to titanium trichloride by reduction with hydrogen, aluminum or titanium metal. Suitable reduction methods are well known in the art and are described, for example, in U.S. Pat. No. 3,362,940.

The other component of the catalyst system is at least one organometallic compound of a metal of Groups 2 or 3. These compounds will have at least one hydrocarbon radical, i.e., alkyl, cycloalkyl, aralkyl, alkaryl, or aryl, attached to the metal through a carbon atom. The other substituents in the organometallic compound can be hydrocarbon radicals, halogen radicals, alkoxy, amino, hydrogen, etc., or combinations thereof. Non-limiting examples of the organometallic compounds are triethylaluminum, tripropylaluminum, dipropylzinc, triisobutylaluminum, diethylmagnesium, diphenylaluminum chloride, cyclohexyl-ethylzinc, diethylaluminum bromide, diethylaluminum chloride, diethylaluminum iodide, ethylzinc chloride, propylmagnesium chloride, dipropylaluminum chloride, dioctylaluminum chloride, diisobutylaluminum hydride, phenylaluminum dihydride, cyclohexylbromoaluminum hydride, dipropylaluminum hydride, propyl zinc hydride, ethylmagnesium hydride, and methoxyaluminum diethyl. Mixtures of two or more organometallic compounds can be used.

The catalyst can be formed by methods well known in the art. Thus, for example, it can be made by charging the components separately to the polymerization zone or they may be combined immediately prior to entry into the zone.

As previously mentioned, the polymerization may be carried out in bulk, in solution, in suspension or in emulsion. Solution polymerization will generally employ inert hydrocarbon solvents such as toluene, benzene or ethyl toluene. Suspension polymerization is generally carried out in an aqueous medium comprising water and suspending agents such as calcium phosphates, polyvinyl alcohol, hydroxyethyl cellulose or sodium polyacrylates. Suitable suspension polymerization techniques will be comparable to those used with styrene monomer, which are well known in the art and described, for example, in U.S. Pat. No. 2,715,118. Emulsion techniques also will be comparable to those used for styrene, using an aqueous medium with the addition of suitable surfactants. Catalysts will normally be of the free-radical type, for example, a combination of butyl peroxide and tertiary butyl perbenzoate.

Polymerization may also be carried out thermally.

The polymerization conditions will generally be similar to those used for styrene. Thus temperatures will generally be in the range of 0° to 200° C., preferably 50° to 150° C., with a range of about −80° C. to +30° C. being most appropriate for cationic polymerization.

The polymers produced by polymerizing the mixture by itself have unexpected and advantageous properties. They have a higher glass transition temperature than polystyrene (which means that the polymer retains its solid state properties at higher temperatures), a higher Vicat softening point than polystyrene and a lower density than polystyrene. They are also cross-linkable either by radiation, e.g. electron beam irradiation or gamma ray, or by chemical cross-linking agents such as dicumyl peroxide and other peroxidic compounds (this is in surprising contrast to the behavior of polymers of styrene which depolymerize when attempts are made to cross-link them chemically with peroxides: the polymers of the present invention cross-link to give insoluble, infusible products). Although the polymers of the present invention have a greater affinity for hydrocarbon solvents than polystyrene (as evidenced by a higher pentane absorption) this can be reduced by polymerizing the mixture with a barrier type monomer such as acrylonitrile. The greater affinity for hydrocarbons is, however, advantageous in the production of expendable beads: the polymers of the present invention cross-link to give insoluble, infusible products. Although the polymers of the present invention have a greater affinity for hydrocarbon solvents than polystyrene (as evidenced by a higher pentane absorption) this can be reduced by polymerizing the mixture with a barrier type monomer such as acrylonitrile. The greater affinity for hydrocarbons is, however, advantageous in the production of expendable beads (for example, similar to those described in British Pat. No. 1,049,144) because the hydrocarbon blowing agents will be retained to a greater degree by the polymer.

The homopolymers can be readily sulfonated and subjected to other electrophilic substitution reactions such as chlorination and bromination. These reactions occur more readily than with polystyrene. The sulfonation can be continued to a degree such that the resultant sulfonated material is water soluble. Control of the degree of sulfonation can therefore be used to regulate the solubility characteristics of the material. The sulfonate groups may, of course, be neutralized by alkalies such as ammonia, sodium hydroxide, potassium hydroxide and the like to give a neutral material. Sulfonating agents such as sulfonyl chloride, chlorosulfonic acid, and sulfur trioxide or sulfuric acid (oleum) may be used to effect the sulfonation. Nuclear halogenation may be carried out by contact with the appropriate halogen, preferably (but not necessarily) in the presence of a suitable catalyst such as a Lewis acid, for example, ferric chloride or ferric bromide. The halogenated polymers, especially the brominated ones, are non-flammable and self-extinguishing materials. Halogenation of the methyl side chains can be carried out by the use of a halogenating agent under free-radical conditions, for example, in the presence of a peroxide or under light or ultra-violet radiation. Organometallic groups can be inserted by reaction of organometallic halides such as tin trimethyl chloride, boron dimethyl chloride, or lead trimethyl chloride in the presence of a Friedel-Crafts catalyst. The resulting materials may form catalysts or radiation resistant polymers.

The polymers are also notable in that faster cycle times are possible for injection molding than with polystyrene and a greater degree of thermal stability is indicated.

The higher glass transition temperature Tg of the polymers, as compared to polystyrene, is a significant advantage. In general, polystyrene has a glass transition temperature of 100°–103° C. as measured by Differential Scanning Calorimeter (DSC) by the method described below. The polymers of the present invention, however, generally have a glass transition temperature above 105° C., usually above 110° C. The exact temperature has been found to depend upon the content of the p-isomer in the monomer mixture, increasing with increasing p-isomer content, as shown in Table 1 below:

TABLE 1

| Content of 1-methyl-4-ethenyl benzene, weight percent | Tg (by DSC) °, ±°C. |
| --- | --- |
| 99.7 | 113 |
| 97.0 | 111 |
| 95.5 | 110 |
| 89.3 | 106 |

By comparison, the polymer of "vinyl toluene" (which contains about 34% of the p-isomer) is only about 88° C.

The DSC method used to determine the glass transition temperature is as follows:

Sample Preparation:

A 500 mg. sample is weighed in tared pan and transferred to 1¼" diameter mold in a Buehler Press and heated to approximately 109° C. The heat is removed and pressure applied to form a disk in the cavity and the disk is cooled. A sample specimen is punched from disk with a No. 7 belt punch and encapsulated in standard sample pan. The sample will weight 15 to 20 mg.

Analysis:

The encapsulated sample is placed in the Differential Scanning Calorimeter Sample Holder. Nitrogen is supplied to the calorimeter at 20 p.s.i. gauge to maintain an inert atmosphere around the sample during the test. The sample is heated at 20° C./min. to a temperature 20° C. above the glass transition temperature. Cooling at 20° C./min. is then permitted to a temperature approximately 80° C. below the observed glass transition. After the sample has equilibrated for 2 min., it is heated at 20° C./min. and the thermogram recorded. Convenient recorder settings are 40 mm./min. chart speed (corresponding to 12.7° C./min.) with full scale deflection of 1 millicalorie/second.

The glass transition is the intersection of the baseline and the sloping change in heat capacity of the sample as the temperature increases.

The polymers are also notable for a higher Vicat softening temperature than polystyrene. Vicat softening temperature is measured by ASTM method D-1525. It also has been found to vary with the content of p-isomer in the monomer mixture, as shown below in Table 2:

TABLE 2

| Content of 1-methyl-4-ethenyl benzene, weight percent | Vicat °C. ± 1° C. |
| --- | --- |
| 99.7 | 118 |
| 97.0 | 119 |
| 95.5 | 114 |
| 89.3 | 108 |

By comparison, styrene has a Vicat of about 107° C. to 108° C. and the polymer of "vinyl toluene" a Vicat of only 97° C. Thus, the present homopolymers are characterized by a Vicat temperature of at least 108° C., generally at least 110° C. or 112° C.

The polymers will generally have a molecular weight corresponding to intrinsic viscosities of 0.1 to 10 (toluene/30° C.). This will generally correspond to molecular weights of at least 30,000 with most molecular weights (Mv-viscosity average) being about 250,000 to 275,000 for commercial materials. The glass transition temperatures for very low molecular weight materials (below 50,000) may be lower than those indicated and therefore not suited for uses where solid state properties are desired. The melt indices will normally be in the range 2.0 to 3.0, generally 2.0 to 2.5. Relative densities of the polymers are comparable to those of styrene, being just above 1.0, generally about 1.01. Good optical properties, as indicated by transmittances of at least 88%, are typical of the polymers. The pentane uptake is generally about 40%, as compared to about 1–2% for polystyrene, thereby indicating a greater affinity for hydrocarbons.

The polymerizable mixture may also be copolymerized with other monomers. The conditions for the copolymerization will, in general, be similar to those used for polymerizing the mixture by itself and for copolymerizing styrene. Thus, initiators, temperatures, pressures, solvents, and recovery processes will be similar to those previously described. The types of copolymer produced may include random, regular, block and graft copolymers. The preparative procedures will be those appropriate to the type of copolymer in question.

Random copolymers may be made with a wide range of comonomers including other vinyl monomers such as styrene, alpha-methyl styrene, acrylates including methyl acrylate, ethyl acrylate, methacrylates including methyl methacrylate, acrylonitrile, olefins especially diolefins such as butadiene, isoprene, chloroprene and mono olefins such as ethylene and propylene.

A particularly preferred class of random copolymers are the random copolymers with butadiene. They may be produced by methods similar to those used in the manufacture of GR-S synthetic rubber and described, for example, in "Synthetic Rubber", Ed. Whitby et al. John Wiley, N.Y., 1954. A suitable polymerization mixture is shown in Table 3 below:

TABLE 3

| Butadiene - MEB Polymerization Formula | |
|---|---|
| | Parts per 100 parts Total Monomers |
| Butadiene | 70 |
| Methyl-ethenyl benzene mixture | 30 |
| Dodecyl mercaptan | 0.5 |
| Potassium persulfate | 0.23 |
| Soap (anhydrous basis) | 4.3 |
| Water | 180 |
| | 285.03 |

Generally, a slightly greater proportion by weight will be required for the methyl ethenyl benzene mixture, as compared to styrene, because of its higher molecular weight. However, the polymerization conditions used for styrene will be generally applicable with the new monomer mixture.

The copolymers with styrene exhibit minimal haze and loss of transmittance for all relative proportions of the comonomers. Although most physical, properties are intermediate to those of polystyrene and the homopolymer, a minimum in the glass transition temperature occurs at about 70% styrene in the copolymer. Also, there is a minimum in the pentane uptake (i.e., minimal affinity for hydrocarbons) at about 65% styrene in the copolymer. The pentane uptake increases rapidly from 50 to 65% styrene.

The copolymers with acrylonitrile are a specially preferred class of copolymers. They have a low affinity for hydrocarbons, especially as compared to the homopolymer. The affinity for hydrocarbons can therefore be controlled by copolymerizing the monomer mixture with varying amounts acrylonitrile. Generally, the amount of acrylonitrile will be from 15 to 35%, preferably about 30%, by weight, although lower amounts, e.g., about 10% of the comonomer will effect useful changes in the properties of the polymer, as shown in Example 8 below.

Another favored class of copolymers are the high impact copolymers. These are generally graft copolymers produced by grafting units derived from the polymerizable mixture onto a backbone polymer which is generally of a rubbery nature. Suitable backbone polymers include polybutadiene, poly(dimethyl butadiene), polyisoprene, polychloroprene and other synthetic rubbers such as the styrene-butadiene rubbers (SBR) ethylene-propylene rubbers (EPR), ethylene-propylene-diene elastomers (EPDM), polyacrylates, nitrile rubbers and copolymers with other aromatic monomers including vinyl toluene. The backbone will generally comprise 2 to 25 percent by weight of the high impact copolymer, preferably 3 to 10 percent by weight. Normal techniques, e.g. grafting, comparable to those used for making high impact polystyrenes are useful; they are well known in the art and referred to, for example, in U.S. Pat. No. 2,694,692 and British Pat. No. 1,054,301.

The high impact copolymers derived from ethylene-propylene-diene elastomers are particularly advantageous in their high temperature stability and weatherability. The copolymers produced from polyisoprene have exceptionally high impact strengths as shown by their Izod impacts. Furthermore, the high impact copolymers according to the present invention are more translucent in thin sections than similar high impact polystyrenes. This is probably because the refractive index of the present polymers is closer to that of the backbone polymers than that of polystryene. A typical comparison of properties is given in Table 4 below. The samples were high impact materials containing 4.89 phm (parts per hundred monomer of cis-polybutadiene.

TABLE 4

| High Impact Materials | | |
|---|---|---|
| | Styrene | Methyl Ethenyl Benzene |
| Tensile Modulus, psi. | 24,000 | 255,000 |
| Yield Strength, psi. | 3,500 | — |
| Break Strength, psi. | 3,320 | 3,710 |
| Elongation, % | 14 | 7.1 |
| Izod Impact (Ft-lbs/in) | 1.3 | 2.10 |
| Vicat Softening, °C. | 100.5 | 108 |
| % Transmission | 77.0 | 83.8 |
| Density | 1.04 | 1.01 |

The monomer mixture is particularly suitable for use as a reactive diluent for thermosetting polyester resins. When mixed with polyesters the monomer mixture produces a resin mix of lower viscosity than vinyltoluene (when used at the same concentration). The cure reaction, on the other hand, is less exothermic than that of vinyl toluene, being more comparable to that of styrene. At the same time, however, the mixture has a higher boiling point and lower vapor pressure than styrene. It therefore has the advantages both of styrene (slower polymerization rate, less exotherm) and of vinyl toluene (higher boiling point, lower vapor pressure).

The polyesters are generally of the liquid or semi-liquid molding, lay-up or spray-up types. Generally they will be solid or semi-solid materials which can be dissolved readily in the monomer mixture on heating. The polyesters will normally be derived from polyhydric alcohols such as ethylene glycol, propylene glycol, butane-1,4-diol or alkylene oxides such as ethylene oxide or propylene oxide. Since linear materials are desired, the alcohol will normally be dihydric. The acids used to make the polyesters are generally dicarboxylic acids such as maleic acid, iso-phthalic acid, terephthalic acid, and their anhydrides e.g. phthalic anhydride. Halogenated derivatives such as tetrabromo phthalic anhydride will yield self-extinguishing (non-flammable) materials. The relative amounts of the mixture and the polyester will normally be in the range of 10 to 50 percent mixture, preferably 30 to 40 of the mixture, by weight. Cure conditions and catalysts for the resin blends will be comparable to those for polyester/styrene blends. Thus, peroxide catalysts will normally be used, optionally with an amine or metallic ion co-catalyst such as N,N-dimethyl-aniline or cobalt octoate. Benzoyl peroxide is a convenient peroxy curing catalyst. Other suitable catalysts will be apparent to those skilled in the art.

The polyester blends will be useful for bulk molding, sheet molding, lay-up, spray up, filament winding and other techniques familiar to those in the art.

The mixture may also be polymerized with monomers such as ethylene oxide and ethylene sulfide to form polar copolymers. Block copolymers with ethylene oxide and sulfide containing from 1 to 50 percent by weight of the polar segment are highly useful as lubricating oil, thickeners, viscosity improvers and detergents. The preparation of these materials will follow the procedures disclosed in U.S. Pat. Nos. 3,867,295 and 3,954,915, except that the styrenic monomers referred to in that patent will be replaced by the monomer mixture according to the present invention. Thus, the monomer mixture will be co-polymerized with a diene such as butadiene or isoprene under anionic conditions using an anionic initiator, such as butyl lithium or styrene sodium, until the desired molecular weight for the oleophilic segment is reached, generally from 1000 to 250,000. This step of the polymerization is preferably carried out in the presence of a randomizing agent such as diethyl ether, dimethoxyethane or any of the other randomizing agents disclosed in U.S. Pat. Nos. 3,867,295 and 3,954,915, the disclosures of which are incorporated herein by reference.

The initial diene/methyl-ethenyl benzene copolymer is then hydrogenated to remove residual vinyl groups. The initial copolymerization may first be terminated by adding a small amount of the polar compound, such as ethylene oxide, followed by a small amount of a mineral acid or acetic acid and subjecting it to hydrogenation or by hydrogenating first and then acidifying. The hydrogenation may also be carried out following the complete addition of the polar block, such as that of ethylene oxide.

The hydrogenation and addition of the polar block is carried out as described in U.S. Pat. Nos. 3,867,295 and 3,954,915. Chain terminating (capping) agents of the type disclosed in these patents are also advantageously used in the same manner as disclosed in the patents, e.g. isocyanates such as tolylene or phenylene diisocyanates and alkyl isocyanates.

The initial polymerization reaction may suitably be conducted at a temperature in the range of from $-80°$ to $100°$ C., but ordinarily room temperature is the desired maximum. The reaction may be terminated within a period of from 15 minutes to over about 4 hours. The second reaction with alkylene oxide or sulfide may be conducted at a temperature of from $0°$ up to about $175°$ C., and the time of reaction may range from about half an hour to about 24 hours. The products can be moved by filtering the precipitated copolymer from the solvent or as preferred by adding a hydrocarbon oil (in which the copolymer can be used) or a process oil and removing the more volatile solvent by stripping or other known means. Should a capping group other than —OM (M is the metal of the initiator) be desired, the reactant providing the group is added to the reaction mixture prior to such separation and the mixture is heated. For example, the addition of toluene diisocyanate to the reaction product would yield a TDIK end group (wherein M is potassium). Any metal halide or oxide side product resulting from the capping reaction may be removed by washing and/or filtration. The retention of metals may be preferably as disclosed in the earlier patents. The block copolymers produced in this way will consist essentially of polymerized methyl ethenyl benzene type block having an average molecular weight of between 1,000 to about 300,000 and a polar portion, preferably polyoxyalkylene, having from 2 up to about 3,500 units, preferably 10 to 1,000 units. Preferred molecular weights of the copolymer will range from about 1,000 to about 300,000 and preferably from 10,000 to about 200,000.

Other viscosity index improvers can be made by copolymerizing the mixture according to the invention with comonomers such as tert-butylstyrene, acrylates, methacrylates, and ethacrylates such as methyl methacrylate, ethyl methacrylate, ethyl acrylate and so forth. Significant improvements in viscosity index can be obtained without serious deterioration in pour point.

The following examples are given in order that the invention may be more fully understood. Proportions and percentages are given by weight. The mixture of isomeric methyl ethenyl benzenes used in all the examples was the same as that in Example 1 below.

EXAMPLE 1

Preparation of polymer from mixture of methyl-ethenyl benzene isomers.

The mixture of methyl ethenyl benzene isomers (p-methylstyrene)-(PMS) used had the following composition (weight percent):

| | |
|---|---|
| Methyl ethenyl benzenes | 99.43 |
| Ethyltoluene | 0.53 |
| Xylenes, cumenes, mesitylenes | 0.01 |
| High boiling materials | 0.03 |
| Methyl ethenyl benzenes: | |
| 1-methyl-2-ethenyl benzene | —(1) |
| 1-methyl-3-ethenyl benzene | 97.0 |
| 1-methyl-4-ethenyl benzene | 3.0 |

Note:
(1)Less than 0.5%.

The mixture (120 g.) was dissolved in 46.75 g. toluene and 0.168 g. azobis-(isobutylronitrile) and poured into a dry bottle which was then closed by a coupling/ball valve assembly. Dry nitrogen was then bubbled through the mixture in the bottle for 10 minutes by means of a needle inserted through the septum and the open ball valve. The nitrogen exited through a short needle piercing the septum on top of the ball valve. The two needles were then removed, the ball valve closed and the bottle placed in an oil bath at 60° C. for 96 hours and at 90° C. for 24 hours.

The polymerized mixture was removed from the bottle by dissolving it in additional toluene at 90° C. The volume of the final solution was about 400 ml. The polymer was then precipitated by pouring the solution into about 1000-1500 ml. methanol in a 4 liter blender (Waring Blender), adjusting the stirring speed to shred the polymer. The liquid was decanted and the polymer washed once with methanol in the blender. The solid polymer [poly(p-methylstyrene)](PPMS) was filtered off and dried in a vacuum oven at 100° C. under vacuum for 48 hours.

The properties of the polymer (PPMS) were as follows:

| | |
|---|---|
| Molecular wt ($M_v$-viscos. Ave) | $269 \times 10^{-3}$ |
| ($M_n$-number Ave) | $158 \times 10^{-3}$ |
| Tg, °C. | 111 |
| Vicat, °C. | 119 |
| Deflection temp. °C. | 98 |
| Melt Index (Cond G) | 2.1 |
| Density g./cc. | 1.008 |
| Break strength, psi. | 6065 |
| Elongation, % | 3 |
| Tensile Modulus: | |
| Rheovibron, psi. $\times 10^{-3}$ | 331 |
| Instron, psi. $\times 10^{-3}$ | 338 |
| Impact strength, ft./lb.-in. | 0.20 |
| Haze | 4.4 |
| Transmittance, % | 89.7 |
| Pentane uptake | 41.0 |

EXAMPLES 1A, 1B, 1C

Polymers prepared in the same way as in Example 1 from similar monomer mixtures containing different proportions of the p-isomer (1-methyl-4-ethenyl benzene) had the following properties:

| Example | 1A | 1B | 1C |
|---|---|---|---|
| p-isomer content, % | 89.3 | 95.5 | 99.7 |
| Molecular wt. ($M_v \times 10^{-3}$) | 271 | 278 | 269 |
| ($M_n \times 10^{-3}$) | — | 168 | 177 |
| Tg., °C. | 106 | 110 | 113 |
| Vicat., °C. | 108 | 114 | 118 |
| Deflection temp. °C. | 93 | 108 | 104 |
| Melt Index., (Cond G) | 3.0 | 2.4 | 2.3 |
| Density g./cc. | 1.014 | 1.011 | 1.008 |
| Break strength, psi. | 6010 | 5330 | 5170 |
| Elongation, % | 1.4 | 8 | 3 |
| Tensile Modulus | | | |
| Rheovibron, psi. $\times 10^{-3}$ | 363 | 325 | 355 |
| Instron, psi. $\times 10^{-3}$ | 309 | 301 | 332 |
| Impact Strength, ft./lb.-in. | 0.28 | 0.13 | 0.21 |
| Haze | 5.0 | 4.2 | 5.2 |
| Transmittance, % | 88.3 | 88.7 | 88.7 |
| Pentane uptake | 40.0 | 40.0 | 40.0 |

EXAMPLE 2

Cross-linking of the homopolymer by chemical cross-linking agent.

A PPMS polymer of the monomer mixture of Example 1 was prepared in the manner described in Example 1.

The polymer was dissolved in tolune to give a 20% by weight concentration. Six samples were prepared and to four of them 1.5 wt. percent (based on polymer) of dicumyl peroxide was added. Films about 5-8 mil thick were cast by pouring the solutions into aluminum dishes and allowing the toluene to evaporate. The films in the dishes were further dried in a vacuum oven at 50° C. for 45 minutes.

The films were placed in an oven at 205° C. for the indicated time in minutes:

| Film No. | 2A | 2B | 2C | 2D | 2E | 2F |
|---|---|---|---|---|---|---|
| Film with peroxide (min. cure) | 2 | 4 | 6 | 8 | — | — |
| Film without peroxide (min. cure) | — | — | | — | 0 | 6 |

The films were then placed in toluene. Films 2E and 2F dissolved in less than 5 minutes. Films 2A to 2D did not dissolve.

EXAMPLE 3

A 10 weight percent solution of poly(p-methylstyrene) (PPMS) of Example 1 in toluene was prepared and 1.6 weight percent benzoyl peroxide was added. Similarly and for comparison, a 10 weight percent solution of polyvinyltoluene (PVT) (65% m-methyl, 35% p-methyl) in toluene was prepared and 1.6 weight benzoylperoxide was added. Films were cast from each solution and allowed to air dry. The films were cut into 1"×1" squares and placed in a vacuum oven overnight to insure that toluene solvent was removed.

The film squares were then cured at 350° F. for various periods of time as shown in the tabulation below. The Tg. of each cross-linked film was determined by DSC. The results are set forth below:

| | Tg, °C. | |
|---|---|---|
| Cure Time, min. | PVT | PPMS |
| 0 | 44 | 65 |
| 0.25 | 39 | 66 |
| 0.5 | 40 | 68 |
| 0.75 | 41 | 64 |
| 1.0 | 42 | 69 |
| 3.0 | 53 | 72 |

During the chemical cross-linking, there is the possibility of oligomer formation from chain scission. Such oligomers along with catalyst residues can act as plasticizers and reduce Tg. Accordingly, the 3-min. cure films were dried in a vacuum oven at 200° F. for 4 hours under 26" vacuum. The Tg, after drying, for PPMS was 85.8° C. and for PVT 67.8° C.

As indicated hereinbefore, the Tg is an important consideration in rigid containers. In order to be dishwasher safe, the container must be able to withstand top rack temperatures of about 70° C. It must also withstand microwave oven conditions without warping or melting and not soften when containing hot liquids. As will be noted from the data in Example 3, the 3 min. cured PPMS had sufficiently high Tg and after vacuum drying its Tg was excellent. On the other hand, the 3 min. cured PVT, even after vacuum drying, had a Tg that was too low for rigid containers.

EXAMPLE 4

Preparation of a high impact material with an ethylene-propylene-diene elastomer (EPDM).

A quantity of 220 g. the mixture of Example 1, 1.1 g. mineral oil ("Nujol") and 11.0 g. EPDM ("Royalene 515" trade mark) (EPDM) were added to a 1 liter reactor equipped with a stirrer and allowed to dissolve. A quantity of 0.071 g. of azobisisobutyronitrile was added and the temperature raised to 90° C. and the stirring spped at 350 rpm. After heating for 2 hrs. at 90° C. $O_2$ 108 g. of benzoyl peroxide was added and the stirring increased to 450 rpm. After 3½ hours heating at 90° C., 0.07 ml. t-dodecylmercaptan, 0.135 g. t-butylperbenzoate and 1.582 g. t-butylperoctoate were added. After a few minutes mixing, an aqueous solution at 90° C. consisting of 320 ml. distilled water, 0.59 g. Gelvatol 20–90 (surfactant) and 1.35 g. sodium chloride, was added and the stirring speed was increased to 550 rpm. The temperature was raised to 94° C. and held for 16 hrs. The temperature was then raised to 96° C. and held for an additional 24 hours.

After the polymerization, the product was collected as small beads, dried and tested.

Test results were as follows:

Izod Impact-1.14 ft.-lb./in., Tensile Modulus-239,000 psi., Break Strength-3970 psi., Melt Index-3.40 g./10 minutes. Vicat Softening temperature-104° C. Transission-60.8%.

EXAMPLE 5

Preparation of a high impact copolymer with polyisoprene.

A quantity of 220 g. of the mixture of Example 1, 1.1 g. mineral oil ("Nujol") and 11.0 g. polyisoprene (Ameripol 600) were added to a 1 liter reactor equipped with strirring and allowed to dissolve. A quantity of 0.071 g. of azobisisobutyronitrile was added and the temperature was raised to 90° C. and the reaction was stirred at 350 rpm. After 2 hours heating at 90° C., 0.108 g. of benzoyl peroxide was added at 90° C. and the stirring increased to 450 rpm. After 3 hr. 30 min. at 90° C., 0.07 ml. of t-dodecylmercaptan, 0.135 g. t-butylperbenzoate and 1.582 g. of t-butylperoctoate were added. After a few minutes mixing, an aqueous solution at 90° C. consisting of 320 ml. distilled water, 0.59 g. (polyvinyl aclohol) (Gelvatol20–90) and 1.35 g. sodium chloride was added to the prepolymer. The stirring speed was raised to 550 rpm and the temperature increased to 94° C. and the reaction allowed to proceed overnight. The following day, the temperature was raised to 96° C. and allowed to proceed for an additional 24 hr.

After the polymerization, the product was collected as small beads, dried and tested.

The test results were as follows:

Izod Impact-1.90 ft.-lb./in., Tensile Modulus-241,000, Break Strength-3260 psi, Vicat Softening 100° C., Melt Index-3.83 g./10 min. Transmission=81.7%.

EXAMPLE 6

Preparation of a high impact copolymer with nitrile rubber.

A quantity of 200 g. of the mixture of Exmple 1, 1.1 g. ("Nujol"), and 11.0 g. nitrile rubber ("Paracril 3300"- trade mark) was added to a 1-liter reactor equipped with stirring and allowed to dissolve. A quantity of 0.071 g. of azo-bisisobutyronitrile was added and the temperature was raised to 90° C. and 350 rpm. After 2 hrs. heating at 90° C. and 350 rpm, 0.108 g. of benzoyl peroxide was added and the reaction allowed to continue. After 3 hr. 30 min. at 90° C., 0.07 ml. of t-dodecylmercaptan, 0.135 g. t-butylperbenzoate and 1.582 g. t-butyl peroctoate were added. After a few minutes mixing, an aqueous solution at 90° C. consisting of 320 ml. distilled water, 0.59 g. (polyvinylalcohol) (Gelvatol 20–90) and 1.35 g. sodium chloride was added to the prepolymer and the stirring speed was increased to 550 rpm and the temperature increased to 94° C. The reaction was allowed to proceed for 16 hrs. at 94° C. and the temperature was raised to 96° C. for an additional 24 hrs.

After the polymerization, the product was collected as small beads, dried and tested.

Test results were as follows:

Izod Impact-0.79ft.-lb./in., Tensile Modulus-288,000 psi., Break Strength-5220 psi. Melt Index=2.45 g./10 min. Transmission=83.4%, Vicat and Softening Point-106° C.

EXAMPLE 7

Preparation of a high impact copolymer with polybutadiene.

A quantity of 226 g. of the mixture of Example 1, 1.1 g. mineral oil ("Nujol") and 11.0 g. of polybutadiene (Taktene 1202) were added to a 1 liter reactor and allowed to dissolve. A quantity of 0.071 g. of azobisisobutyronitrile was added and the temperature raised to 90° C. Stirring speed was set at 300 rpm. After 2 hr. at 90° C. and 300 rpm, 0.208 g. of benzoyl peroxide was added and the reaction was continued at 90° C. and 300 rpm. After 4 hr. 25 min. after the start, 0.05 ml. of t-dodecylmercaptan, 0.150 g. t-butylperoctoate, and 0.135 g. of t-butylperbenzoate were added at 90° C. 300 rpm. After a few minutes of mixing, a water solution (320 ml.) containing 0.59 g. of polyvinyl alcohol (Gelvatol 20–390) and 1.35 g. of sodium chloride was added at 90° C. to the polymer mix. The stirring speed was increased to 600 rpm and the temperature raised to 94° C. The suspended polymer was allowed to react for 16 additional hr. at 94° C.

The final product was recovered in the form of small beads which were subsequently molded and tested.

The test results were as follows:

Izod impact-2.10 ft.-lb./in., Tensile Modulus 255,000 psi. Break Strength-3710 psi. Melt Index-1.10 g./10 min. Vicat Softening Temp.-108° C. Density=1.01 g./cc. and Transmission=83.8%.

This copolymer is notable for its high softening temperature, low density and high transparency.

EXAMPLE 8

Preparation of a high impact copolymer from acrylonitrile/butadiene/methyl ethenyl benzene.

Into a clean, dry, nitrogen-purged, three liter, four neck, round bottom flask was charged 272.7 g. of polybutadiene latex (Polysar PL-662) (55% polybutadiene). The flask was fitted with a stirrer, thermometer, reflux condenser and 1000 ml. addition funnel. A solution was prepared by mixing 12.0 g. sodium stearate, 0.9 g. sodium bicarbonate, 1.5 g. sodium hydroxide, 3.0 g. potassium persulfate and 1322 g. deionized water. The mixture was heated to 60° C. while stirring until a clear, homogeneous solution was obtained. This solution was then charged into the reaction flask to dilute the stirred polybutadiene latex. A solution containing 435.6 g. of the mixture of Example 1, 164.4 g. acrylonitrile and 2.7 g. tert-dodecyl mercaptan was prepared and placed in the addition funnel. With stirring and the charge temperature controlled at 60° C., monomer addition was started and maintained at 0.5%/min. After all the monomer had been added, polymerization was allowed to proceed for one additional hour. The latex was sampled to determine conversion by measuring total solids content. Antioxidant was added to the latex in the form of 42 g. of an 18% emulsion containing 2/1-TNPP/Irganox 1076.

The ABPMS was recovered by pouring the hot, filtered latex into four volumes of rapidly stirred, 1.5% aqueous $CaCl_2$ solution at 100° C. The crumb was filtered and hot water washed. The crumb was vacuum-dried for 40 hours at 85° C. with a slow nitrogen sweep through the oven.

Conversion was over 95%. Precoagulum present in the latex was less than one percent, based on total resin. The yield of resin was about 740 g. Injection molded samples, prepared by direct mold of the dried resin crumb, had notched Izod Impact Strength of 6.3 ft. lb./in.

The product is suitable for extrusion or injection molding to form hard, tough, impact-resistant articles such as drain pipe or appliance housings.

EXAMPLE 9

Preparation of copolymers with styrene.

A mixture of 6.00 g. the monomer mixture of Example 1, 1800 g. styrene monomer, 10.30 g. of toluene, and 0.0336 g. azoisobutyronitrile initiator (DuPont "Vazo 64") was heated in a nitrogen atmosphere (nitrogen bubbled through for 10 minutes) at 60° C. for 119 hours, and then at 90° C. for 24 hours. The polymer was removed from the tube with the aid of more toluene, and precipitated by pouring the toluene solution into an excess of methanol in a blender. The polymer was dried in a vacuum oven at 80–110° C. and 30 inches vacuum.

The reaction was repeated with 12 g. each of the monomer mixture, 18 g. of the mixture and 6 g. of styrene and also with 24 g. of styrene and of the monomer mixture to produce a range of samples having varying comonomer ratios.

The samples were compression molded and tested for tensile modulus on a Rheovibron machine. The results were as follows:

| Polymer No. | 6A | 6B | 6C | 6D | 6E |
| --- | --- | --- | --- | --- | --- |
| MEB monomer, wt. % | 0 | 25 | 50 | 75 | 100 |
| Styrene, wt. % | 100 | 75 | 50 | 25 | 0 |
| Modulus, psi. $\times 10^{-3}$ | 332 | 382 | 329 | 356 | 331 |
| Pentane uptake, percent | 1.0 | 1.5 | 23 | 30.5 | 41 |

The copolymer with 75% styrene has a notably high tensile modulus.

EXAMPLE 10

Preparation of a copolymer with acrylonitrile.

A mixture of 22.50 g. the monomer mixture of Example 1, 2.50 g. of acrylonitrile monomer, 10.90 g. of toluene (reagent grade) and 0.0350 g. azoisobutyronitrile initiator (DuPont "Vazo 64") was heated in a nitrogen atmosphere (nitrogen bubbled through for 10 minutes) at 60° C. for 96 hours, then at 90° C. for 24 hours. The polymer was removed from the tube with the aid of more toluene, and precipitated by pouring the toluene solution into an excess of methanol in a blender. The polymer was dried in a vacuum oven at 80° C. first 20 hours, then at 110° C. and 30 inches vacuum for 50.0 hours. The glass transition temperature was 107° C.

A plaque was pressed from the polymer and a specimen put in pentane at 23° C. After 24 hours, the specimen was removed from the pentane and weighed. From a plot of its weight vs. time, the pentane uptake was calculated at 4.18±0.09%, compared to 40 to 41% uptake of pentane by three homopolymers of the mixture prepared in the same fashion. The addition of acrylonitrile therefore reduces the affinity for hydrocarbons substantially. This is of great utility in foam extrusion, indicating that the copolymers of reduced hydrocarbon affinity are useful as foamable resins.

EXAMPLE 11

Preparation of a block copolymer with ethylene oxide

A quantity of 34.5 ml. of the monomer mixture of Example 1 was dissolved in 2000 ml. of hexane in a 3 l. flask equipped with a stirrer. To this was added 242 g. of butadiene. After degassing and purification, the monomer mixture was initiated with 1.5 ml. of 2.3 N butyl lithium in the presence of 1.3 ml. tetrahydrofuran which was used as a randomizing agent. The polymerization was allowed to proceed at 50° C. for 4½ hr. at which time the reaction was terminated with a small amount of ethylene oxide followed by an equally small amount of acetic acid. The polymer solution was then hydrogenated using a Ni/Keiselguhr catalyst. After essentially complete hydrogenation of the butadiene double bonds, the catalyst was removed by filtration. The polymer solution containing 30 g. of the hydrogenated polymer was then reacted with 0.342 ml. of 1.095 N potassium t-amyloxide. A quantity of 8.35 ml. of ethylene oxide was then added and the polymerization of the ethylene oxide was carried out at 90° C. for 16 hr.

The resulting block copolymer was then dissolved in oil at 1.2 wt. %. It raised the viscosity of the oil from about 8 cs. to 17 cs. at 100° C.

EXAMPLE 12

Preparation of a copolymer with tertiary butylstyrene.

A mixture of 10.0 g. of the mixture of Example 1, 13.6 g. of tertiary-butylstyrene monomer, 7.8 g. of toluene and 0.0330 g. of azoisobutyronitrile initiator (DuPont "Vazo 64") was freed of air by bubbling nitrogen gas for 10 minutes, and then it was heated successively at 60° C. for 96 hours, and 90° C. for 24 hours. The polymer was removed from the tube with additional toluene (110 ml.), and precipitated by pouring into methanol (600ml.). It was dried at 80° C./30 inches vacuum for 23 hours, and at 100° C./30" vacuum for 22 hours. The number average molecular weight measured by osmometry was 228,000.

A solution of 2.15% by weight of the polymer in a lubricating oil had a viscosity index of about 147, and a pour point of −35° C. The estimated requirement for the oil was about 4% by weight. (Actual 2.15% solution viscosities were 53.54 cs. at 40° C. and 8.93 cs. at 100° C.).

The polymer may also be added directly to the oil from the toluene solution, and the toluene removed, or made in a purified oil of the desired type.

EXAMPLE 13

Sulfonation of the polymer.

The polymer of Example 9 was dissolved in toluene and sulfonated at ambient temperature with chlorosulfonic acid in varying amounts. The sulfonation products were neutralized with sodium hydroxide or ammonia and the solvent removed.

The properties of the products were as follows:

| Expt. | Moles Cl SO₃H/Mole Monomer | Conditions | Neutralization | Properties |
|---|---|---|---|---|
| 11A | 0.46 | 25° C./30min. | NaOH | water soluble Insol. CHCl₃, Toluene, hexane |
| 11B | 0.20 | 25° C./2 hr. | NH₃ | water insoluble methanol soluble toluene insoluble |
| 11C | 0.10 | 25° C./2 hr. | NH₃ | Insoluble water hexane; swollen in toluene |

The products of Experiments 11B and 11C could be pressed into high softening point films. The glass transition temperature of the product of Experiment 11B was 140° C. and that of Experiment 11C was 113° C.

EXAMPLE 14

Preparation of a brominated polymer.

Bromine (13.5 g. dissolved in 50 ml. of methylene dichloride) was added dropwise to a solution of 10 g. of the polymer of Example 1 dissolved in 100 ml. of methylene dichloride containing 0.2 g. of FeBr₃ during 30 minutes with stirring in an ice bath. Stirring was continued for 30 minutes and the mixture was then allowed to warm to room temperature with stirring overnight. The resulting solution was washed with water, potassium carbonate solution and the polymer precipitated by addition to methanol.

After drying there was isolated a product with the analysis:

| C | H | Br |
|---|---|---|
| 56.52 | 4.89% | 38.74% |

The product was dissolved in toluene and treated with a solution of potassium - t - amyl oxide to remove small amounts of reactive bromine. The resulting product was thermally stable and could be pressed into films which were self extinguishing and did not support combustion.

EXAMPLE 15

Preparation of a chlorinated polymer.

Chlorine was bubbled into a solution of 10.0 g. of the polymer of Example 1 in 100 ml. of methylene dichloride containing 0.2 g. of FeCl₃ at room temperature over 4 hours. The resulting solution was washed with 10% K₂CO₃ solution and water and the polymer isolated by precipitation in methanol.

Analysis of the polymer after drying showed:

| %C | %H | %Cl |
|---|---|---|
| 75.57 | 6.59 | 17.89 |

To remove traces of reactive halogen, the polymer was dissolved in toluene and treated with potassium - t - amyloxide. The treated polymer could be molded into high softening temperature films.

EXAMPLE 16

Thermosetting blends with polyester resins.

In this Example, the polyester resins shown in Table 1 below were used:

TABLE 1

| POLYESTER RESINS EVALUATED | | |
|---|---|---|
| PRODUCER | DESIGNATION | POLYESTER TYPE |
| Grace | GR 941 base resin | General purpose low viscosity, non promoted |
| Grace | GR 665 base resin | Flexible resin |
| Reichold | 33-031 | Rigid, low viscosity, low reactivity thixotropic promoter |
| Koppers | 1000-25 | General purpose, low reactivity, medium viscosity |
| Koppers | 6000-25 | Isophthalic resin, high reactivity |

The polyester resins were formulated with styrene, vinyl toluene (approximately 60% m-methylstyrene 40% p-methylstyrene VT) and the monomer mixture of Example 1 (MEB). The mixtures were compatible in all cases.

The viscosities of the mixes are as shown in Table 2 below:

TABLE 2

| POLYESTER Resin | MONOMER Type | % Conc. | Viscosity 30° C. Cp. × Density |
|---|---|---|---|
| GR 665 | Styrene | 38.5 | 327 |
| GR 665 | MEB | 38.7 | 420 |
| GR 665 | VT | 37.8 | 453 |
| GR 941 | Styrene | 40.0 | 243 |
| GR 941 | MEB | 40.0 | 418 |
| GR 941 | VT | 40.0 | 400 |
| GR 511 | Styrene | 40.0 | 124 |
| GR 511 | MEB | 40.0 | 149 |
| GR 511 | VT | 40.0 | 154 |
| Koppers 1000-25 | Styrene | 26.5 | 1450 |
| Koppers 1000-25 | Styrene | 40.0 | 162 |
| Koppers 1000-25 | MEB | 26.5 | 3390 |
| Koppers 1000-25 | MEB | 40.0 | 215 |
| Koppers 1000-25 | VT | 26.5 | 3640 |
| Koppers 1000-25 | VT | 40.0 | 293 |
| Koppers 6000-25 | Styrene | 31.2 | 2570 |
| Koppers 6000-25 | Styrene | 40.0 | 485 |
| Koppers 6000-25 | PMS | 31.2 | 3650 |
| Koppers 6000-25 | PMS | 40.0 | 680 |
| Koppers 6000-25 | VT | 31.2 | 4620 |
| Koppers 6000-25 | VT | 40.0 | 745 |
| Reichold 33-031 | Styrene | 40.0 | 145 |
| Reichold 33-031 | PMS | 40.0 | 212 |
| Reichold 33-031 | VT | 40.0 | 227 |

The results in Table 2 show that the mixes with the MEB according to the present invention generally have a lower viscosity (at the same concentration) than the mixes with vinyl toluene. This facilitates handling and use of the mixes.

Samples of two resin systems containing styrene, vinyltoluene, and MEB were then cured as thin films under identical conditions and the modulus properties of these films measured as a function of temperature using the Rheovibron thermomethanical analyzer.

The resins were prepared and cured in the following manner:

Samples of resin containing 40% of styrene and equal weights and equal molar amounts (40% and 43%) of vinyltoluene and MEB were prepared. These samples were then treated with 4% Lupersol 224 (4% active oxygen) and 0.5% of a 3% solution of cobalt octoate and press cured as a thin film at 60° C. for 30 minutes followed by an oven post cure at 110° C. for an additional 30 minutes.

Samples were then cut from these films for Rheovibron analysis. Modulus temperature characteristics of these films were measured from 25° C. to 130° C. and the glass transition temperature obtained from the maximum in the loss modulus cure. The modulus values at 25° C. and 100° C. and the observed glass transition temperature are listed in Table 3. Surprisingly, it can be seen that the values of glass transition and 100° C. modulus for the MEB mixes are similar to those obtained for styrene while the values obtained for vinyltoluene are considerably different with glass transition temperatures being lower in one resin and higher in the other.

TABLE 3

TABLE 3A - GR 665 POLYESTER

| Monomer | % | Modulus (dynes/cm² × 10⁻⁹) | | Tg° C. |
|---|---|---|---|---|
| | | 25° C. | 100° C. | |
| Styrene | 40 | 27.5 | 2.6 | 81 |
| Vinyltoluene | 40 | 32.3 | 13.5 | 102 |
| MEB | 40 | 29.4 | 3.4 | 79 |

TABLE 3B - GR 941 POLYESTER

| Styrene | 40 | 25 | 16.7 | 120 |
|---|---|---|---|---|
| Vinyltoluene | 43 | 24 | 10.6 | 107 |
| MEB | 43 | 27.3 | 11.7 | 116 |
| MEB | 40 | 26.8 | 14.4 | 118 |

EXAMPLE 17

Preparation of copolymer with acrylonitrile by suspension polymerization.

A solution comprising the following ingredients was preheated to 60° C. while stirring until clear:

| | Wt., g. |
|---|---|
| Sodium stearate | 22.5 |
| Sodium bicarbonate | 1.5 |
| Sodium hydroxide | 1.1 |
| Potassium chloride | 1.5 |
| Potassium persulfate | 3.8 |
| Water | 1455.0 |

The solution was charged into a clean, dry, nitrogen purged, three-liter four-neck, round bottom flask held in a 60° C. constant temperature bath. The flask was then fitted with a stirrer, thermometer, reflux condenser and a 1000 ml. addition funnel. A solution of 544.5 g. of the isomer mixture of Example 1, 205.5 g. acrylonitrile and 4.5 g. tert-dodecyl mercaptan (equivalent to 45.7 mole percent acrylonitrile in the feed) was added at the rate of 0.5% per minute. After all the monomer had been added the polymerization was continued for one additional hour.

The resin was recovered by pouring the hot, filtered latex into four volumes of 1.5% aqueous CaCl₂ solution, stirred rapidly at 100° C. The resultant crumb was filtered, washed with hot water and dried in a vacuum oven for 40 hours with slow nitrogen sweep through the oven.

Conversion: 99%

The properties of the copolymer (compared to those of a styrene/acrylonitrile copolymer produced in the same way using a feed containing 45.7 mole percent acrylonitrile) are shown below:

| | MEB/AN resin | Styrene/AN resin |
|---|---|---|
| Mole percent AN | | |
| -from % N | 43 | 43 |
| -by NMR | 49 | 42 |
| Heat loss % | 0.3 | 0.8 |
| (1g. sample 24 hrs. at 100° C., vacuum) | | |
| $M_w/M_n$ (by GPC) | 2.5 | 2.3 |
| Melt Index g/10 min. | 7.4 | 6.0 |
| Tg (DSC)° C. | 110 | 105 |
| TGA, °C. (5% wt. loss) | | |
| -in air | 380 | 375 |
| -in N₂ | 410 | 410 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A chemically cross-linked polymer of methyl ethenyl benzene derived from a polymerizable mixture of isomers of methyl ethenyl benzene consisting essentially of less than 10 percent by weight 1-methyl-3-ethenyl benzene, at least 90 percent by weight 1-methyl-4-ethenyl benzene, and 0 to 0.1 percent 1-methyl-2-ethenyl benzene.

2. The polymer of claim 1 in which the isomers are present in the mixture in the following proportions by weight:
   1-methyl-2-ethenyl benzene: 0 to 0.05%,
   1-methyl-3-ethenyl benzene: 1 to 5%, and
   1-methyl-4-ethenyl benzene at least 95%.

3. The polymer of claim 1 in which the isomers are present in the mixture in the following proportions by weight:
   1-methyl-2-ethenyl benzene: 0 to 0.05%,
   1-methyl-3-ethenyl benzene: 1 to 3%, and
   1-methyl-4-ethenyl benzene at least 97 to 99%.

* * * * *